H. A. WAHLERT.
BRAKE LEVER BRACKET.
APPLICATION FILED SEPT. 1, 1917.

1,294,354.

Patented Feb. 11, 1919.

INVENTOR
Henry A. Wahlert
by Wm. M. Cady
Att'y.

UNITED STATES PATENT OFFICE.

HENRY A. WAHLERT, OF ST. LOUIS, MISSOURI, ASSIGNOR TO THE AMERICAN BRAKE COMPANY, OF ST. LOUIS, MISSOURI, A CORPORATION OF MISSOURI.

BRAKE-LEVER BRACKET.

1,294,354.  Specification of Letters Patent.  Patented Feb. 11, 1919.

Application filed September 1, 1917. Serial No. 189,366.

*To all whom it may concern:*

Be it known that I, HENRY A. WAHLERT, a citizen of the United States, residing at St. Louis and State of Missouri, have invented new and useful Improvements in Brake-Lever Brackets, of which the following is a specification.

This invention relates to fluid pressure brake apparatus, and more particularly to a brake cylinder.

With the usual brake cylinder, a bracket is formed on the rear cylinder head for the cylinder brake lever. It is necessary, in different installations, to arrange the brake lever at different angles and this requires a separate brake cylinder head for each variation in brake lever angularity, so that the angularity of the lever bracket will correspond with the desired angularity of the brake lever.

In order that the same brake cylinder head may be employed in all cases, the principal object of my invention is to provide a lever bracket which can be adjusted to suit the angularity of the brake lever.

Figure 1:
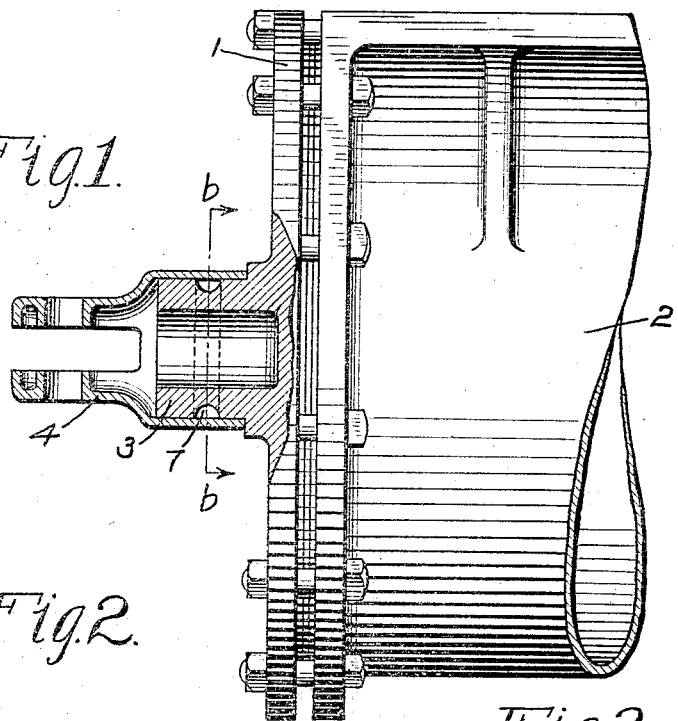
Figure 2:
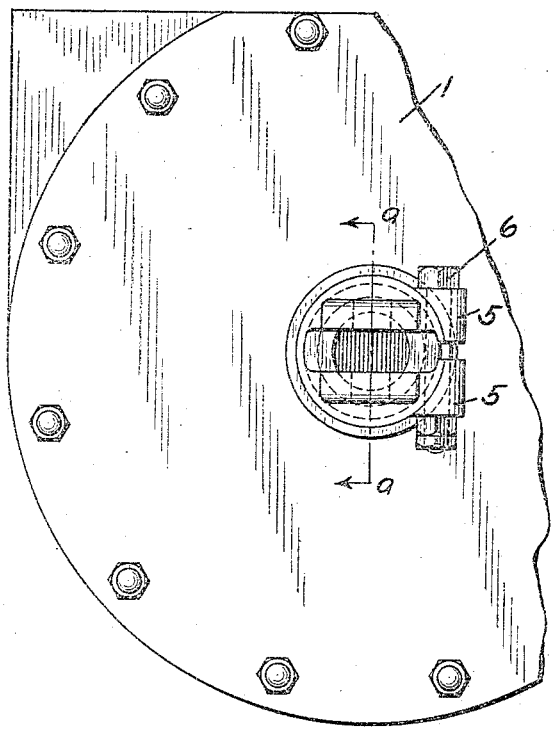
Figure 3:
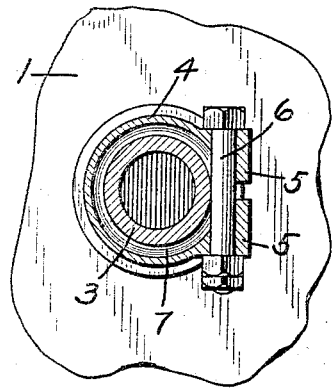

In the accompanying drawing; Figure 1 is a view of the rear portion of a brake cylinder with the improved lever bracket applied thereto, and shown in section on the line $a$—$a$ of Fig. 2; Fig. 2 an end view of the brake cylinder and the lever bracket; and Fig. 3 a section on the line $b$—$b$ of Fig. 1.

According to my invention, the rear cylinder head 1 of the brake cylinder 2 is provided with a centrally arranged cylindrical boss 3 and mounted on the boss is an adjustable lever bracket 4 which is split on one side and is provided with lugs 5 through which a clamping bolt 6 extends.

The boss 3 may be provided with a peripheral groove 7 for receiving the bolt 6, so as to prevent the bracket from working off the boss.

It will now be clear that by loosening the clamping bolt 6, the lever bracket 4 may be turned on the boss 3 so as to give the desired angularity and then by tightening the bolt, the bracket will be held firmly in its adjusted position.

Having now described my invention, what I claim as new and desire to secure by Letters Patent, is:—

1. The combination with a brake cylinder head having a cylindrical boss, of a brake lever bracket rotatably mounted on said boss and means for clamping said bracket in a position corresponding with the angularity of the brake lever.

2. The combination with a brake cylinder head having a cylindrical boss provided with a peripheral groove, of a split brake lever bracket mounted on said boss and a bolt for clamping same in position and engaging in said groove.

In testimony whereof I have hereunto set my hand.

HENRY A. WAHLERT.

Copies of this patent may be obtained for five cents each, by addressing the "Commissioner of Patents, Washington, D. C."